United States Patent [19]
Wheeler

[11] 3,724,986
[45] Apr. 3, 1973

[54] APPARATUS FOR PROTECTING AN EXTRUSION HEAD FROM OVER PRESSURE

[75] Inventor: Clayton A. Wheeler, Plainville, Conn.

[73] Assignee: Monsanto Company, St. Louis, Mo.

[22] Filed: Oct. 7, 1970

[21] Appl. No.: 78,741

[52] U.S. Cl.................................425/154, 425/466
[51] Int. Cl............................B29f 3/04, B29d 23/04
[58] Field of Search.........18/14 R, 14 G, 14 V, 14 P, 18/13 C, 12 DM, 30 CR, 30 JT, 30 JM, 12 B; 425/153, 151, 461, 466, 467, 154

[56] References Cited
UNITED STATES PATENTS

| | | | |
|---|---|---|---|
| 3,218,672 | 11/1965 | Langecker | 18/14 V |
| 3,221,371 | 12/1965 | Stevens | 18/14 V |
| 3,423,793 | 1/1969 | Anger | 18/14 V |
| 2,595,210 | 4/1952 | Clinefelter | 425/380 X |

*Primary Examiner*—J. Spencer Overholser
*Assistant Examiner*—David S. Safran
*Attorney*—James C. Logomasini, Michael J. Murphy and Neal E. Willis

[57] ABSTRACT

Means for automatically relieving excess pressure in an extrusion head of the type which includes a spider member therein.

6 Claims, 2 Drawing Figures

PATENTED APR 3 1973　　3,724,986

INVENTOR
CLAYTON A. WHEELER

BY:
Michael J. Murphy

ATTORNEY:

APPARATUS FOR PROTECTING AN EXTRUSION HEAD FROM OVER PRESSURE

BACKGROUND OF THE INVENTION

This invention relates to an extrusion head for forming tubular parisons of thermoplastic material and more particularly to means for relieving pressure in such a head when it exceeds a predetermined level.

Spider shaped members mounted within an extrusion head for forming thermoplastic parisons are known in the prior art. Such a member generally includes a center post in the flow passage for evenly and outwardly distributing the material being processed into the flow passage in order to avoid weld line formation in the parison. Arms extend outwardly from this center post and cooperate with the head structure to rigidly support the post in the flow passage. Since these arms traverse the flow passage, they should be kept as narrow in the circumferential direction as possible, or in other words as light in construction as mechanically feasable in order to provide minimum resistance to flow. Also, if such spider arms are constructed excessively wide in the circumferential direction they can themselves cause weld line formation(s) in the material, or they may act as stagnant areas where the material being processed can accumulate and eventually decompose. One form of spider construction is shown and described in copending application Ser. No. 61,381 filed Aug. 5, 1970, now U.S. Pat. No. 3,676,039 and assigned to the assignee of the present invention.

A problem arises with extrusion heads utilizing such spider members when the pressure in the head exceeds normal levels because, e.g., of a process malfunction. When this occurs, the arms which are necessarily of relatively lightweight construction tend to fracture or crack as a result of stresses generated thereon by the high pressure. Such high pressures can occur, for example, when the extrusion system is restarted without a clean out after a shut down to change over from one molded product configuration to another. Under such conditions, plastic which has set up at least in part in the forward or outlet end of the head acts as a resistance to flow of more fluid material entering the head from the extruder and thus the pressure in the head increases. The problem is especially acute when the head is equipped with means for varying the size of the extrusion orifice, since when the outlet orifice size is at a minimum in forming a parison of reduced wall thickness, the pressure in the head will accordingly increase, and this is especially true when the reduced wall thickness represents a major portion of the parison length, e.g., when producing lightweight containers. Also, should one of the movable members defining the variable size outlet orifice malfunction and stick in a position which closes off the outlet orifice (e.g., when severing the formed parison in the outlet) the problem will also occur.

The tendency of the arms to fracture is even more acute when utilizing a head of the type set forth in the previously mentioned copending application, in that a pair of the arms of the spider member are slotted in order to accept a pin therein which is associated with the means for moving the member defining the inner surface of the variable size outlet orifice. With such a system, the metal forming the arms must be reduced even further in order to define these slots. Needless to say, repeated replacement of a rather complex part such as one of these spider members, which must be highly machined to close tolerances, represents a costly deterent to an economical operating system, as does the system down time associated with such a replacement.

An approach in the past towards alleviating the problem of excess pressure in an extrusion head has been the use of a rupture disc on the head, but such discs have been rather unreliable since material being processed sets up on contacting the relieving surface after a period of use and variable results are obtained in terms of rupture disc relief-pressure. Also, such rupture disc systems have proved rather expensive since portions contacting the material being processed must generally be constructed of special materials in order to avoid contaminating the thermoplastic.

SUMMARY OF THE INVENTION

Now, however, there has been developed a new technique for relieving excess pressure in an extrusion head of the type utilizing an internal spider arrangement for improving material flow through the head.

Accordingly, it is a principal object of this invention to automatically relieve pressure in an extrusion head when it reaches a predetermined level.

Another object of this invention is to provide means for automatically relieving pressure in an extrusion head which functions reliably to the extent that it will consistently relieve at a predetermined pressure each time.

A further object of this invention is to provide means of the aforementioned variety which is extremely simple and inexpensive to fabricate.

An additional object of this invention is to provide means of the aforementioned variety which is useable in an extrusion head for forming tubular parisons either of constant or variable wall thickness.

Other objects of this invention will in part be obvious and will in part appear hereinafter.

These and other objects are accomplished in an extrusion head for producing a thermoplastic parison which includes a spider member removably mounted therein having a plurality of spaced arms in the flow passage of the head, an extrusion ring member at the outlet end of the head spaced from inner tip means, the space therebetween defining an extrusion orifice for the parison, by providing the improvement which comprises shear means adjacent the outlet for relieving pressure in said head when it rises above a predetermined level. These shear means though always sensing the pressure developed in the head are never exposed to the material being processed and thus may be constructed of relatively inexpensive material.

The preferred form of shear means comprises a tubular member surrounding the extrusion ring having substantially horizontally extending ears abutting against locking means securing the tubular member against the extrusion ring. These ears shear away from the tubular member to release the extrusion ring and thereby relieve pressure developed in the head when said pressure exceeds that which may be withstood by the metal at the tubular member-ear interconnection.

BRIEF DESCRIPTION OF THE DRAWING

In describing the overall invention, reference will be made to the accompanying drawing wherein.

DETAILED DESCRIPTION OF THE INVENTION

Figure 1:
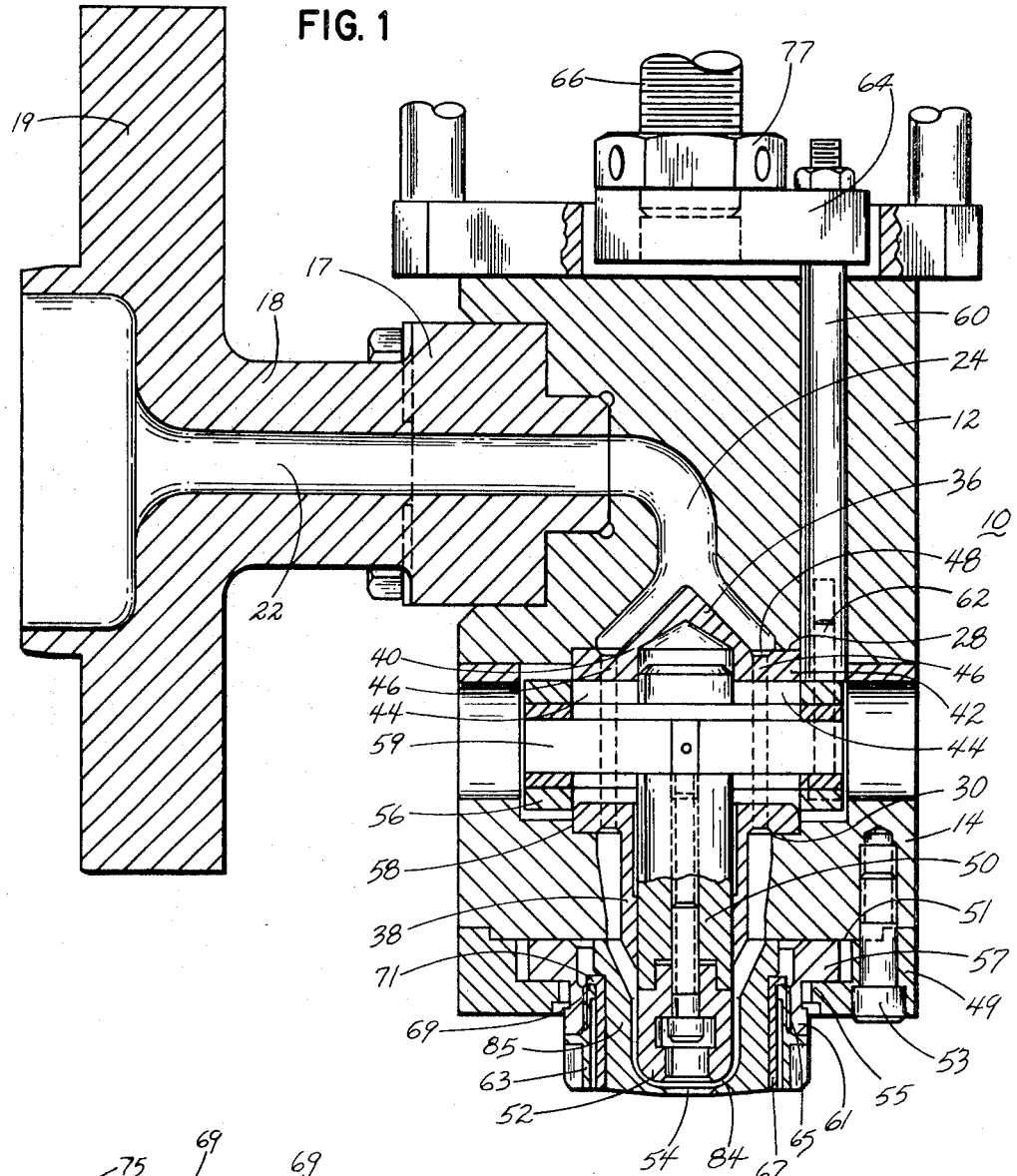
FIG. 1 is a vertical section of an assembled extruder head embodying the present invention.
Figure 1:
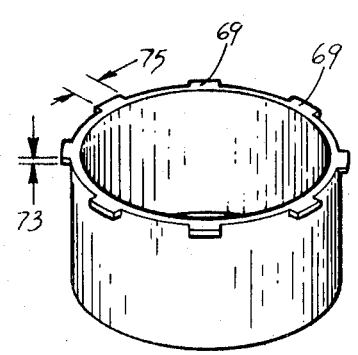

Referring now to the drawings, there is illustrated in FIG. 1 an extrusion head in assembled condition, generally indicated as 10, for producing a thermoplastic parison of varying wall thicknesses. It should be noted, that though the pressure relieving means of the present invention to be described hereafter in more detail is associated with a head depicted as having variable orifice capability, such pressure relieving means are likewise useable in heads having a fixed outlet orifice size.

Extrusion head 10 comprises a housing having an upper portion 12 and a lower portion 14 releasably secured by any suitable means to upper portion 12. Head 10 further includes a horizontally oriented inlet member 18 secured also by suitable conventional means to upper portion 12, e.g., by means of intermediate member 17. Inlet member 18 has a conventional flange 19 for connection to the outlet end of a conventional horizontally mounted extruder, such that flow of the heat plastified thermoplastic enters head 10 through horizontally extending passage 22 of entrance member 18. Though the embodiment of the invention illustrated in the drawing contemplates an inlet to the extrusion head at 90° to the outlet, the invention is likewise applicable to heads wherein the entrance end lies in a plane generally parallel to the outlet. Likewise, though downward extrusion is contemplated in the illustrated embodiment, the invention is likewise applicable to extrusion in the upward direction.

Upper portion 12 of extrusion head 10 has a flow passage 24 therein in the shape of a downwardly directed gooseneck, the horizontal portion thereof being aligned opposite the downstream end of passage 22, with the vertical portion extending at 90° to the horizontal portion.

Extrusion head 10 further includes a one piece spider member disposed therein which is rigidly clamped between upper housing portion 12 and lower housing portion 14 as generally depicted in FIG. 1 by the same conventional means (not shown) securing upper and lower portions 12 and 14 together. Under such conditions, sealing occurs between faces 28 and 30 of ring portion 42 of the spider member and the opposing surfaces in upper and lower housing portions 12 and 14 respectively. The spider member has a conical nose portion 36 which, when head 10 is in the assembled position of FIG. 1, has its upper extremity located at the lower end of the vertical portion of gooseneck shaped passage 24. The conical wall of nose 36 is situated in an expanded portion of the flow passage of the upper housing portion 12. The spider member further includes a hollow cylindrical portion defined by wall 38 extending downwardly from the base 40 of conical portion 36. Ring portion 42 of the spider member is spaced outwardly from and concentric with cylindrical wall 38 and conical portion 36, and has a pair of vertically oriented, oppositely disposed slots 44 formed therein for a purpose to be described hereafter in more detail. A plurality of arms 46 spaced from each other about the periphery of the flow passage span the space 48 between and rigidly secure cylindrical wall portion 38 and ring portion 42 together. The space between cylindrical portion 38 and ring portion 42 defines the flow passage for the material being processed through the spider member. The upper portions of these arms 46 should preferably increase smoothly in cross section (not shown) in the direction of downward flow through head 10 in order to decrease frictional resistance to flow of the material. Arms 46 are the portions of the spider member which the pressure relieving means of the present invention, to be described hereafter in more detail, are primarily meant to protect. Space 48 constitutes an extension in the vertical direction of the flow passage for the plastic material through the head. Vertically oriented slots also extend through a pair of oppositely disposed arms 46 and cylindrical portion 38 and represent an extension of slot 44 in ring portion 42. As will be described hereafter in more detail, this slot which extends through this plurality of members is associated with a means for varying the size of the extrusion orifice.

A mandrel 50 is vertically slidably mounted within cylindrical portion 38 and has a lower section which extends beyond the lower end of cylindrical portion 38 of the spider member. This lower section has tip portion 52 thereon which cooperates with opening 54 in lower housing portion 14. The space therebetween defines an annular outlet orifice 84 for forming a thermoplastic parison therein.

At the lower end of lower portion 14 of extrusion head 10, clamping member 49 is held against face 51 by means of one or more bolts 53. Clamping member 59 has a step 55 thereon which cooperates with a shoulder 57 in collar 61 so as to hold collar 61 rigidly against surface 51 of lower body portion 14 when locking nut 63 is threaded axially upwardly against collar 61, by means of threads along the opposing surfaces of collar 61 and nut 63 in the area generally indicated as 65.

Figure 2:
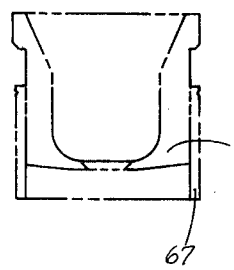
FIG. 2 is a perspective view of an embodiment of the pressure fracturable shear means portion of the present invention appearing in FIG. 1.

The shear means of the present invention located laterally adjacent orifice 84 for releasing pressure in extrusion head 10 comprises tubular member 67 (FIG. 2) located between extrusion ring member 85 and locking nut 63. The vertically extending body portion of tubular member 67 abuts against the outer surface of extrusion ring member 85 as illustrated in FIG. 1 and has a plurality of substantially horizontally extending ears 69 abutting against the upper surface 71 of locking nut 63 when locking nut 63 is secured against collar 61. Ears 69, as illustrated in FIG. 2, are equidistantly distributed about the periphery of tubular member 67 and, in the illustrated embodiment, are on the order of 1/16 inch in thickness in the axial direction, i.e., 73, and 9/16 inch in width in the circumferential direction, i.e., 75 in FIG. 2. Ears 69 are preferably between 3 and 8 in number for processing most conventional types of thermoplastics, and are preferably located, as illustrated, at the upper end of tubular member 67, or in other words at the end of member 67 which is remote from extrusion orifice 84.

Extrusion head 10 further includes means for axially moving mandrel 50 to vary the size of extrusion outlet orifice 84 and consequently the wall thickness of the parison being formed therein. These means include an actuating sleeve 56 mounted for axial movement along the outer surface 58 of ring member 42. Dowel pin 59 extends thru slots 44 in ring member 42, spider arms 46, cylindrical portion 38 as well as thru a horizontal bore in mandrel 50. As illustrated, pin 59 is rigidly fastened at each end to sleeve 56. Upper housing portion 12 has a plurality of vertically extending bores formed therein, which, in the illustrated embodiment, are three in number. One rod 60 is positioned in each of these bores and is threadably fastened at the lower end by means of a fastening member 62 to sleeve 56, and at its upper end to vertically movable collar 64. Shaft 66 is threadably secured in collar 64 by means of a conventional locknut 77. Conventional means such as a fluid actuable cylinder (not shown) are connected to the upper end of shaft 66 for imparting axial movement to shaft 66. Though not shown, conventional electrically operated resistance heaters or their equivalent in contact with outer surface portions of head 10 may be used to keep the thermoplastic being processed sufficiently low in viscosity as to avoid generation of excessive pressures in head 10 under normal operating conditions.

In operation, heat plastified thermoplastic enters gooseneck 24 through horizontal passage 22 and is evenly dispersed outwardly on contacting conical nose portion 36 so as to flow downwardly through space 48 between ring member or portion 42 and cylindrical portion 38 of the spider member as a result of the pressure generated in the extruder to which head 10 is secured. The material thus eventually assumes the dimensions of the annular space between the outer surface of tip portion 52 of mandrel 50 and the inner surface of extrusion ring 85 as it flows toward extrusion outlet orifice 84, where a pendant thermoplastic parison is formed which is then severed and molded, e.g., by blowing, into the shape of an article. The flow passage for the material as it passes through head 10 including the spider member and lower housing member 14 is streamlined in cross section and is free of any corners or projections which might provide areas for heat sensitive thermoplastic being processed to build up and eventually degrade.

When it is desired to vary the size of the extrusion outlet orifice by changing the clearance between the surface of tip portion 52 of mandrel 50 and the upper edge of opening 54 of extrusion ring 85, axial motion is imparted to tip member 52 via means such as a pressurized fluid operated piston operatively associated with shaft 66. This motion is imparted to tip portion 52 of mandrel 50 via collar 64 which is attached to shaft 66, pins 60 attached to collar 64, actuating member 56 attached to pins 60, and dowel pin 59 attached at each end to member 56 and passing through a bore in mandrel 50. Thus, the relationship of tip portion 52 with respect to the upper surface defining opening 54 in extrusion ring member 85 is variable. The extent of movement of tip portion 52 is defined by the vertical spacing on either side of pin 59. Such a variation in the size of outlet 84 accordingly will cause a corresponding variation in the wall thickness of the parison being formed in the outlet. Extrusion ring member 85 is releasably secured in lower housing portion 14 via locking nut 63 and serves to establish the size of the flow passage adjacent the outlet for a particular family of materials. For example, in changing from one type of thermoplastic to another having a substantially different melt viscosity, extrusion ring member 85 may be changed to increase or decrease the resistance to flow as desired.

As is obvious from FIG. 1, the pressure of the material passing through head 10 is imposed upon shear ring or tubular member 67 because of contact of the latter with extrusion ring 85. When this pressure becomes sufficiently high as to generate stresses in the joint area between ears 69 and the upper end of member 67 into which they are connected which exceed the total strength of the metal in these joint areas, the ears will shear off along this joint and extrusion ring 85 as well as the body portion of member 67 will fall away from the extrusion head in the manner generally depicted in phantom lines at the lower portion of FIG. 1. The size of the opening through which the plastic may issue is thus increased and accordingly the pressure in the head is reduced so as to avoid cracking any of the portions of the spider member and particularly the rather fragile arms 46.

The pressure at which the shear ring will release is, of course, dependent on the mass of the metal present in the shear area between the tubular portion and the ears. Thus, if dimension 75 in the circumferential direction is increased, dimension 73 in the axial direction may be decreased. Though the number of ears 69 may vary widely, they usually range between 3 and 8 for a 9/16 inch dimension 75 and a 1/16 inch dimension 73 at a release pressure of between 4000 to 6000 psig. It should be understood, however, that a single continuous ledge extending radially outwardly of the upper end of member 67, when made sufficiently thin in axial dimension, is likewise within the scope of the present invention.

The above description and particularly the drawings are set forth for purposed of illustration only and are not to be taken in a limited sense.

Though a mechanical connection has been illustrated and is preferred as the means for imparting movement to the mandrel in the illustrated spider type extrusion head, it should be understood that alternative means which may be hydraulically or electrically actuated may be utilized. Typical of alternative approaches for actuating mandrel 50 is the system disclosed and illustrated in copending application Ser. No. 639,686, filed May 19, 1967, and assigned to the assignee of the present invention.

Though any number of arms angularly oriented with respect to each other may be utilized to interconnect the mounting ring member with the cylindrical housing of the spider member, two are desired in order to keep the obstructions to the flow of material through the head at a minimum.

Though the pressure shear ring of the present invention may be fabricated from any material, relatively inexpensive carbon steel is adequate and acceptable in all cases regardless of the sensitivity of the thermoplastic being processed to contact with certain metals. This is so because the shear ring is positioned outside the material contacting portions of the extrusion head, or in other words outside the extrusion ring which defines the outer surface of the extrusion orifice. Also, with such a location, no buildup of the material being processed on the shear means can ever occur, and thus the integrity of the relief system is preserved independent of the nature of the thermoplastic.

Various modifications and alterations will be readily suggested to persons skilled in the art. It is intended, therefore, that the foregoing be considered as exemplary only and that the scope of the invention be ascertained from the following claims.

What is claimed is:

1. In an extrusion head for producing a thermoplastic parison which includes a spider member removably mounted therein having a plurality of spaced arms in the flow passage of the head, an extrusion ring member at the outlet end of said head spaced from inner tip means, the space therebetween defining an annular extrusion orifice for the parison, and clamping means for holding said extrusion ring member in place against said head the improvement which comprises tubular shear means intermediate said extrusion ring member and clamping means for relieving pressure in said head when it rises above a predetermined level, said tubular shear means being completely shielded by the extrusion ring from exposure to the thermoplastic material during extrusion.

2. The apparatus of claim 1 wherein:
   a. an opposing pair of said arms have slots formed therein;
   b. said tip means including a tip member and means for axially moving said tip member, said means for axially moving said tip member including a pin movable in said slots.

3. In an extrusion head for producing a thermoplastic parison which includes a spider member removably mounted therein having a plurality of spaced arms in the flow passage of the head, an extrusion ring member at the outlet end of said head spaced from inner tip means, the space therebetween defining an annular extrusion orifice for the parison, the improvement which comprises shear means adjacent said outlet for relieving pressure in said head when it rises above a predetermined level, said shear means comprising a tubular member surrounding said extrusion ring having substantially horizontally extending ears abutting against lacking means securing said tubular member against said extrusion ring.

4. The apparatus of claim 3 wherein the ears on said ring are between three and eight in number, said ears being located at the end of said tubular member remote from said extrusion orifice.

5. The apparatus of claim 4 wherein said ears are equidistantly spaced about the periphery of said tubular member, and are each on the order of one-sixteenth inch in thickness in the axial direction and nine-sixteenths inch in width in the circumferential direction.

6. The apparatus of claim 5 wherein said locking means includes a collar rigidly mounted against said extrusion head and a locking nut threadably secured in an axial direction against said collar, said tubular member being located between the extrusion ring and the locking nut, the ears on said tubular member abutting against the upper end of said locking nut when said locking nut is secured against said collar.

* * * * *